(12) United States Patent
Hartmann et al.

(10) Patent No.: US 7,096,279 B2
(45) Date of Patent: Aug. 22, 2006

(54) OBJECT-NAMING NETWORK INFRASTRUCTURE FOR IDENTIFICATION TAGS AND METHOD OF OPERATION THEREOF

(75) Inventors: Clinton S. Hartmann, Dallas, TX (US); William C. Bonner, Bellevue, WA (US)

(73) Assignee: RF Saw Components, Inc., Richardson, TX (US)

( * ) Notice: Subject to any disclaimer, the term of this patent is extended or adjusted under 35 U.S.C. 154(b) by 744 days.

(21) Appl. No.: 10/062,791

(22) Filed: Jan. 30, 2002

(65) Prior Publication Data

US 2003/0145036 A1 Jul. 31, 2003

(51) Int. Cl.
*G06F 15/16* (2006.01)

(52) U.S. Cl. .................. 709/245; 709/201; 709/217; 709/218; 709/219; 709/225; 709/226; 707/10; 340/10.4

(58) Field of Classification Search ............... 709/201, 709/202, 203, 217, 218, 219, 223, 224, 225, 709/226; 707/10; 340/10.4
See application file for complete search history.

(56) References Cited

U.S. PATENT DOCUMENTS 6,064,979 A   5/2000  Perkowski
6,421,674 B1 * 7/2002  Yoakum et al. ............... 707/10
2003/0137403 A1 * 7/2003  Carrender et al. ......... 340/10.4

FOREIGN PATENT DOCUMENTS

WO   WO 00/60484      10/2000
WO   WO 01/37540 A2    5/2001

\* cited by examiner

*Primary Examiner*—Yves Dalencourt

(57) ABSTRACT

An object-naming network infrastructure and a method of responding to queries for object names. In one embodiment, the infrastructure includes: (1) a central object name server coupled to a computer network and constituting a first hierarchical level and (2) peripheral object name servers coupled to the computer network and constituting a second hierarchical level, the central object name server responding to an object name query received from a querying system by directing the querying system to query instead one of the peripheral object name servers in the second hierarchical level, the one of the peripheral object name servers either responding to the query with an object name or directing the querying system to query instead further peripheral object name servers constituting a third hierarchical level.

22 Claims, 13 Drawing Sheets

**THREE REFLECTORS WITH MINIMUM SPACING OF 5 SLOTS HAVE 286 POSSIBLE PLACEMENTS IN 21 SLOTS
EACH ROW SHOWS A UNIQUE PLACEMENT OF 2 ITEMS (X&Y) AND MULTIPLE PLACEMENT FOR THE 3RD (Z)**

FIG.10

IN 10 SLOTS, TWO REFLECTORS WITH MINIMUM SPACING OF 2 SLOTS HAVE 36 POSSIBLE PLACEMENTS

| STATE | 0 | 1 | 2 | 3 | 4 | 5 | 6 | 7 | 8 | 9 |
|---|---|---|---|---|---|---|---|---|---|---|
| 0 | X |   | Y |   |   |   |   |   |   |   |
| 1 | X |   |   | Y |   |   |   |   |   |   |
| 2 | X |   |   |   | Y |   |   |   |   |   |
| 3 | X |   |   |   |   | Y |   |   |   |   |
| 4 | X |   |   |   |   |   | Y |   |   |   |
| 5 | X |   |   |   |   |   |   | Y |   |   |
| 6 | X |   |   |   |   |   |   |   | Y |   |
| 7 | X |   |   |   |   |   |   |   |   | Y |
| 8 |   | X |   | Y |   |   |   |   |   |   |
| 9 |   | X |   |   | Y |   |   |   |   |   |
| 10 |   | X |   |   |   | Y |   |   |   |   |
| 11 |   | X |   |   |   |   | Y |   |   |   |
| 12 |   | X |   |   |   |   |   | Y |   |   |
| 13 |   | X |   |   |   |   |   |   | Y |   |
| 14 |   | X |   |   |   |   |   |   |   | Y |
| 15 |   |   | X |   | Y |   |   |   |   |   |
| 16 |   |   | X |   |   | Y |   |   |   |   |
| 17 |   |   | X |   |   |   | Y |   |   |   |
| 18 |   |   | X |   |   |   |   | Y |   |   |
| 19 |   |   | X |   |   |   |   |   | Y |   |
| 20 |   |   | X |   |   |   |   |   |   | Y |
| 21 |   |   |   | X |   | Y |   |   |   |   |
| 22 |   |   |   | X |   |   | Y |   |   |   |
| 23 |   |   |   | X |   |   |   | Y |   |   |
| 24 |   |   |   | X |   |   |   |   | Y |   |
| 25 |   |   |   | X |   |   |   |   |   | Y |
| 26 |   |   |   |   | X |   | Y |   |   |   |
| 27 |   |   |   |   | X |   |   | Y |   |   |
| 28 |   |   |   |   | X |   |   |   | Y |   |
| 29 |   |   |   |   | X |   |   |   |   | Y |
| 30 |   |   |   |   |   | X |   | Y |   |   |
| 31 |   |   |   |   |   | X |   |   | Y |   |
| 32 |   |   |   |   |   | X |   |   |   | Y |
| 33 |   |   |   |   |   |   | X | Y |   |   |
| 34 |   |   |   |   |   |   | X |   |   | Y |
| 35 |   |   |   |   |   |   |   | X |   | Y |

FIG.11

IN 10 SLOTS, TWO REFLECTORS WITH MINIMUM SPACING OF 3 SLOTS AND ALLOWING
ONLY ONE EVEN NUMBERED AND ONE NUMBERED SLOT PROVIDES 16 POSSIBLE STATES

| STATE | 0 | 1 | 2 | 3 | 4 | 5 | 6 | 7 | 8 | 9 |
|---|---|---|---|---|---|---|---|---|---|---|
| 0  | X |   |   | Y |   |   |   |   |   |   |
| 1  | X |   |   |   |   | Y |   |   |   |   |
| 2  | X |   |   |   |   |   |   | Y |   |   |
| 3  | X |   |   |   |   |   |   |   |   | Y |
| 4  |   | X |   |   | Y |   |   |   |   |   |
| 5  |   | X |   |   |   |   | Y |   |   |   |
| 6  |   | X |   |   |   |   |   |   | Y |   |
| 7  |   |   | X |   |   | Y |   |   |   |   |
| 8  |   |   | X |   |   |   |   | Y |   |   |
| 9  |   |   | X |   |   |   |   |   |   | Y |
| 10 |   |   |   | X |   |   | Y |   |   |   |
| 11 |   |   |   | X |   |   |   |   | Y |   |
| 12 |   |   |   |   | X |   |   | Y |   |   |
| 13 |   |   |   |   | X |   |   |   |   | Y |
| 14 |   |   |   |   |   | X |   |   | Y |   |
| 15 |   |   |   |   |   |   | X |   |   | Y |

FIG.12

OBJECT-NAMING NETWORK INFRASTRUCTURE FOR IDENTIFICATION TAGS AND METHOD OF OPERATION THEREOF

TECHNICAL FIELD OF THE INVENTION

The present invention is directed, in general, to computer networks and, more specifically, to an object-naming computer network infrastructure for identification tags and a method of operating the same to identify objects with which particular identification tags are associated.

BACKGROUND OF THE INVENTION

Familiar to all are the various bar codes and magnetic strips employed by businesses to perform identification functions and the various devices used to read them. Generally, magnetic strips are read by swiping a card with the strip on it, such as a credit card, through a reader. Magnetic strips can also read by contact or proximity devices where the card, such as a parking or access card, is placed on or held close to the reader. Bar codes are generally read by using a "light gun" to read the code and identify the item associated with that particular code. Bar codes and magnetic strips are presently the identification systems of choice because they are cheap.

The applications for which bar codes and magnetic strips are useful is limited, however, by the relatively small amount of data they can encode and by their inherent readability limitations. One such readability limitation is the range at which they can be read. Both are short range systems that require the reader to contact or be very close (a few centimeters, at most) to the bar code or magnetic strip in order to decode data. They are also limited by the fact that no obstruction can exist between the reader and the bar code or magnetic strip for the reader to accurately decode data. The orientation of the reader relative to the bar code or magnetic strip can also impose a significant readability problem. If the reading device is not properly aligned or is held at an incorrect angle, the encoded information can not be read. Because of these problems, each individual read operation requires manual scanning by a human operator if high read accuracy is needed. The various limitations of bar codes and magnetic strips have prevented their use in a wide range of applications for machine readable tags that need highly reliable and totally automated reading at read ranges up to several meters.

The radio frequency identification ("RFID") tag is another prior art type of identification device. When interrogated, RFID tags reflect or retransmit a radio frequency signal to return an encoded identification number to the interrogator. A good example of RFID tags is their usage in the collection of highway and bridge tolls where an RFID tag is positioned on a user's vehicle to respond to an interrogation signal when the vehicle passes through a toll collection point. A reading device connected to a computer processes the tag identification number and uses the decoded information to charge the toll to the user's credit card.

Prior art RFID tag devices are of two basic types; those that contain a microchip and those that do not. There is a radical difference in cost and performance between these two types; to such an extent, in fact, that they rarely compete with one another as to the appropriate type of use. As a general rule, chip tags cost more but have a larger data capacity than chipless tags. Chip tags, for example, are usually not available below a unit cost of about one dollar each when ordered in a quantity of less than one million; whereas many chipless tags are projected to cost less than 20 cents each, even when ordered in quantities as small as one hundred thousand.

Most RFID tags will have a longer reliable range than magnetic strips and bar codes. As a rule, RFID tags can be interrogated without having as significant line-of-sight and orientation problems as are evidenced by bar codes and magnetic strips. Although chip tags do have a longer range than magnetic strip and bar code systems, the range at which they can be reliably used is still a limiting factor.

Chip tags are by far the most popular of the two types of RFID tags. A chip tag consists of four elements or features: (1) a computer microchip; (2) circuits for converting radio signals to computer data signals and back to radio signals; (3) an antenna; and (4) a means for providing DC power to the chip circuitry. In low cost RFID chip tags the first two features are often partially or totally integrated into a single microchip, which integration requires certain compromises in tag performance (read range, number of bits, etc.). This combination of features also leads to certain integrated circuit (IC) cost and/or design compromises to accommodate both digital and radio frequency circuitry on a single IC. The impact of these design compromises can be partially compensated for by use of low radio frequency (RF) operating frequencies that, in turn, lead to rather large and expensive antennas.

The most daunting problem with chip tags is the need for DC power for the chip circuitry. The combination of environmental issues coupled with severe constraints on cost, size and weight usually require that the tag not have a battery or other on-board power source. The only generally useable solution is to obtain DC power by converting RF power received from the tag reader signal into DC power within the tag. Those skilled in the pertinent art term tags without a battery or other power source as "passive" tags, while those that contain a battery or other source are termed "active" tags. The passive method of providing DC power to a chip tag requires a more efficient tag antenna (i.e., larger size and cost) and higher transmitted power levels from the reader. It also requires added components that either add to the cost of the microchip or to the cost of the tag, which additional components also result in an increased tag size. The most important limitation of passive powered chip tags is the severe restriction on the read range of the tag because a signal that is sufficiently strong enough to power the tag will only extend a short distance from the tag reader antenna. Thus, while chip tags have the dominate share of the RFID market, their high cost and limited read range combine to prevent them from replacing either bar codes or magnetic strips in any significant manner.

"Chipless" RFID tags do not contain a microchip but, instead, rely on magnetic materials or transistorless thin film circuits to store data. A major advantage of chipless RFID tags is their relatively low cost. The disadvantages of chipless tags include that they are range limited (several centimeters at the most) and only contain limited amounts of information. The severity of these problems has prevented market acceptance of chipless tags in spite of their low cost potential.

In the year 2000, the global market for conventional RFID systems and services was in the order of 500 million U.S. dollars. This market was largely for chip tags that typically cost from about one dollar to tens of dollars each. While chipless tags are not selling well, they have generated great interest from a number of potential users because of their low cost potential. A huge gap exists in the automatic identification market between the very low cost bar codes and the higher performing RFID chip tags. The overall market is clamoring for a technical solution to fill that gap.

The critical characteristics of any new automatic identification technology that will fill this gap are: (1) a cost of between one cent and ten cents per tag when manufactured in large quantities; (2) reliable reading without the need for manual scanning by a human operator; (3) reliable reading without requiring a line of sight between the tag and tag reader (i.e., reliable reading even if the tag is scratched, or covered with dirt, or on the wrong side of the package, etc.); (4) a reliable read range of at least one to two meters; and (5) a tag data capacity of roughly 100 bits. Such tags are of vital interest to postal authorities, airlines and airports, mass transit authorities, animal breeders, the livestock industry, delivery businesses, any business with significant supply chains, particularly those that maintain inventory or handle fast moving consumer goods, and so on. These are all applications where a high priced tag is not practicable, particularly where the tag is disposable or is going to be sold with the product.

The limitations and problems with prior art identification systems has been the major factor limiting their widespread usage. Although prior art identification systems are frequently associated with computers and computer networks, there has been a very limited demand for access to identification information provided by such prior art devices. In short, the distribution and use of such identification information is limited by the limitations inherent in the devices. What has been needed in the art is a reliable, economically priced, small identification tag upon which can be encoded substantial identification data that can be read at an adequate range and that can be used in a variety of environments and for a variety of applications. As will be discussed herein, such devices and readers for such devices have been recently developed and will soon be available. These identification tags can be encoded with substantial identification data and can be read at an adequate range for use in a variety of environments and for a variety of applications.

Because such identification tags can be used to identify with global certainty a very large number of objects, a system to provide widespread access to the data and other information made possible by such tags is necessary. The volume of information and data made possible by this new identification technology makes the Internet, as currently structured, of marginal usefulness because of the slow speed at which the Internet can be accessed to secure pertinent information.

Therefore what is needed in the art is an object-naming computer network infrastructure for identification tags and a method of operating the same.

SUMMARY OF THE INVENTION

To address the above-discussed deficiencies of the prior art, the present invention provides an object-naming network infrastructure and a method of responding to queries for object names. In one embodiment, the infrastructure includes: (1) a central object name server coupled to a computer network and constituting a first hierarchical level and (2) peripheral object name servers coupled to the computer network and constituting a second hierarchical level, the central object name server responding to an object name query received from a querying system by directing the querying system to query instead one of the peripheral object name servers in the second hierarchical level, the one of the peripheral object name servers either responding to the query with an object name or directing the querying system to query instead further peripheral object name servers constituting a third hierarchical level.

The present invention therefore introduces an object-naming network infrastructure that is attuned to providing names associated with a structured address space. In contrast to the present-day domain name service, DNS (which must deal with arbitrary address space assignments), the present invention is hierarchically distributed, dramatically decreasing the traffic that the central object name server is required to handle. Instead, peripheral object name servers can receive queries directly from querying systems, provided the querying systems have cached the address of the appropriate peripheral object name server.

In one embodiment of the present invention, the object name query comprises a unique code associated with the object name. In an embodiment to be illustrated and described, the object name query comprises a 96-bit number derived from an identification tag. In a related but independent embodiment, the object name query comprises information derived from a surface acoustic wave identification tag. Those skilled in the art will realize that a 96-bit tag provides a prodigious address space.

In one embodiment of the present invention, the querying system contains an object name cache for containing the object name, the querying system directing the object name query to the cache before directing the object name query to the central object name server. Unlike DNS, even partial addresses can assist the querying systems in avoiding queries to the central object name server or lower hierarchies.

In one embodiment of the present invention, at least some of the peripheral object name servers of the second hierarchical level are associated with corresponding object manufacturers. Thus Boeing may have a peripheral object name server for all of the objects (airplanes and parts) that it manufactures.

In one embodiment of the present invention, address spaces of the peripheral object name servers of the second hierarchical level are centrally assigned. This keeps the overall assignment of address space orderly and intact, and therefore allows cached former queries to guide the direction of future queries so as to avoid higher server hierarchies as possible.

In one embodiment of the present invention, address spaces of the further peripheral object name servers of the third hierarchical level are assigned by corresponding object manufacturers. Thus, Boeing may assign a peripheral object name server in a third hierarchical level to each of its divisions, thereby relieving its second-level peripheral object name server of excess traffic.

In one embodiment of the present invention, the querying system is associated with a tag reader. During the course of its operation, the tag reader may read many tags and, as part of its operation, identify object names that go with those tags using the infrastructure of the present invention. Of course, those skilled in the pertinent art will understand that querying systems may be independent of tag readers or may be part of other machines.

In one embodiment of the present invention, the computer network is the Internet. Those skilled in the pertinent art will understand, however, that any computer network can form a suitable environment within which the infrastructure of the present invention may operate.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 10 illustrates a table showing the 286 possible states that exist when three reflectors are used in a group of 21 slots having a skip factor of four;

FIG. 11 illustrates a table showing the states for a SAW RFID tag with 10 slots, two reflectors and 36 possible placements;

FIG. 12 illustrates a table showing one sub-group of states from a SAW RFID tag with four reflectors per group, 20 slots per group, a skip factor of three, a phase increment between adjacent slots ±90° with division into two sub-groups and only one reflector of each specific phase per group.

DETAILED DESCRIPTION

Figure 1:
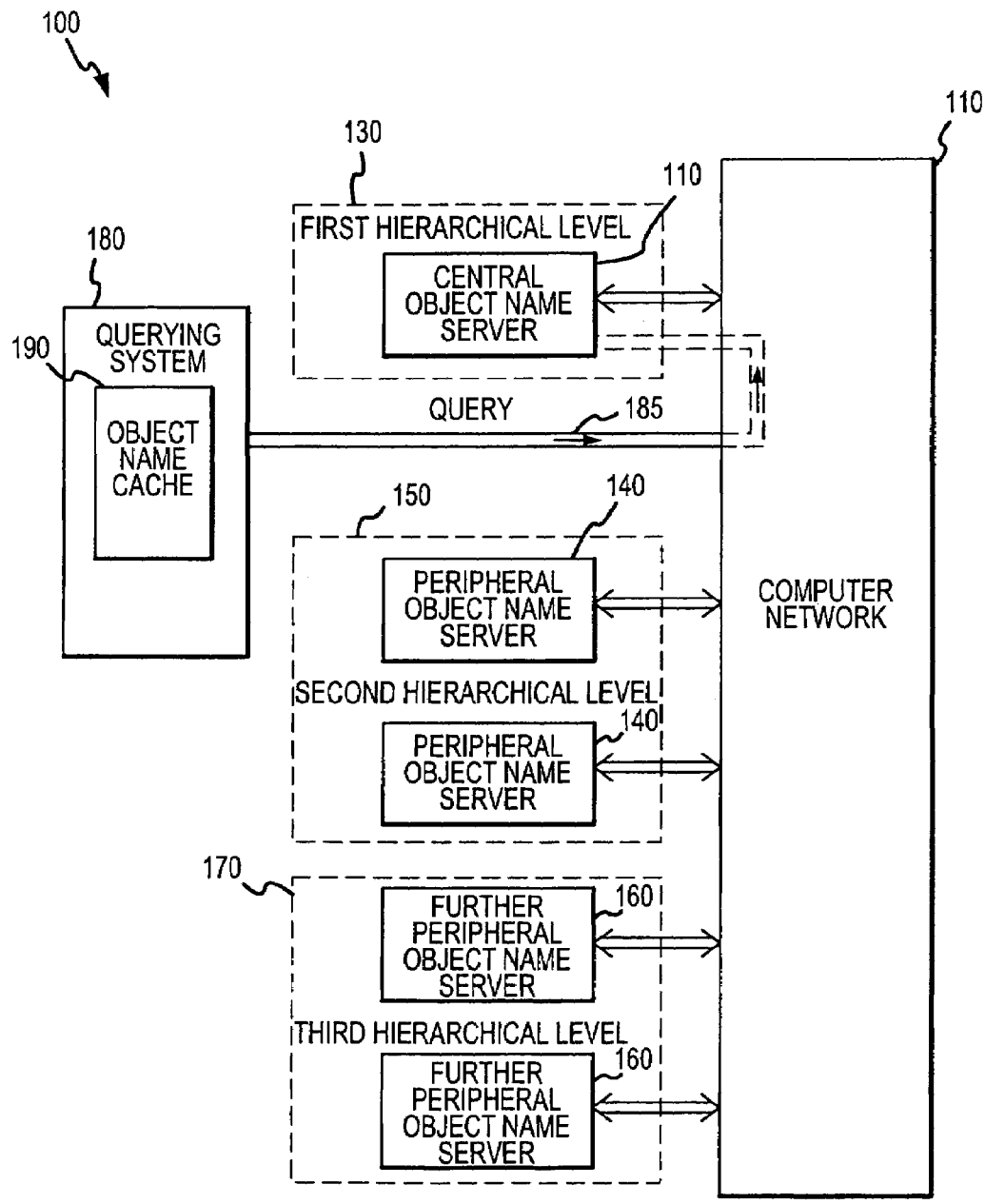
FIG. 1 illustrates a a block diagram of one embodiment of an object-naming network infrastructure constructed in accordance with the present invention.

Referring initially to FIG. 1, illustrated is a block diagram of one embodiment of an object-naming network infrastructure 100 constructed in accordance with the present invention. Coupled to a computer network 110 is a central object name server 120 that constitutes a first hierarchical level 130 of the object-naming network infrastructure 100. Peripheral object name servers 140 constituting a second hierarchical level 150 of the infrastructure 100 are also coupled to the computer network 110. Further peripheral object name servers 160 constituting a third hierarchical level 170 are also associated with or coupled to the network 110.

In the illustrated embodiment, the central object name server 120 responds to an object name query 185 received from a querying system 180 by directing the querying system 180 to instead query 185 (not shown) one of a number of the peripheral object name servers 140 in the second hierarchical level 150. The peripheral object name servers 140 either respond (not shown) to the query 185 with an object name or, alternatively, direct the querying system 180 to instead query 185 (not shown) the further peripheral object name servers 160 that constitute a third hierarchical level 170.

The querying system 180 in the illustrated embodiment of the infrastructure 100 contains an object name cache 190 for containing an object name. In this embodiment 100, the querying system 180 directs an object name query 185 to the cache 190 before directing the query to the central object server 120.

The illustrated object-naming network infrastructure 100 is particularly attuned to the provision of names associated with a structured address space. In contrast to the present-day domain name service (DNS) (which must deal with arbitrary address space assignments) as embodied in the Internet, the hierarchical distribution of the present invention dramatically decreases the amount of traffic the central object name server 120 is required to handle. Instead, peripheral object name servers 140 can receive queries 185 directly from querying systems 180, provided the querying systems 180 have the address of the appropriate peripheral object name server 140 in an object name cache 190.

In one embodiment of the invention, the object name query 185 comprises information derived from a surface acoustic wave (SAW) identification tag. As noted above, the illustrated infrastructure 100 can be beneficially used in connection with named objects associated with a structured address space. SAW identification tags are particularly useful when employed with the infrastructure 100 described herein for a number of reasons, but chiefly because the high data capacity of such tags permits a structured address space. A description of SAW identification tags is set forth in detail in U.S. Pat. No. 6,966,493, entitled "Surface Acoustic Wave Identification Tag Having Enhanced Data Content and Methods of Operation and Manufacture Thereof," by Hartmann, commonly assigned wit the invention and incorporated herein by reference. A description of SAW identification tag readers for reading SAW identification tags is set forth in detail in U.S. Pat. No. 6,708,881, entitled "Reader For a High Information Capacity Saw Identification Tag and Method of Use Thereof," by Hartmann, commonly assigned with the invention and incorporated herein by reference. Those of ordinary skill in the pertinent art will recognize that, notwithstanding the beneficial aspects of employing the illustrated infrastructure 100 with SAW identification tags, the present invention may be usefully employed with other object-naming or identification systems, whether now known or subsequently developed, and still he within the intended scope of the present invention.

To provide a better understanding of the illustrated infrastructure 100, consider a business system where each object within the system has an identification device (such as a SAW identification tag) coupled to or associated with it that has a unique identification code or number. Such identification code or number may be unique only within the relevant business system or it may be globally unique if the identification device used is a SAW identification tag or other identification tag with a sufficiently large data capacity.

As will be discussed herein, SAW identification tag devices constructed in accordance with the invention described by Hartmann can have encoded thereon globally unique identification numbers. In fact, the data capacity of SAW identification tags is sufficiently large to permit several different fields of information to be encoded, which fields can include, for example, a field containing information about the tag manufacturer, an industry identification field, an error correction field, an object identification number field, and so on.

Figure 2:
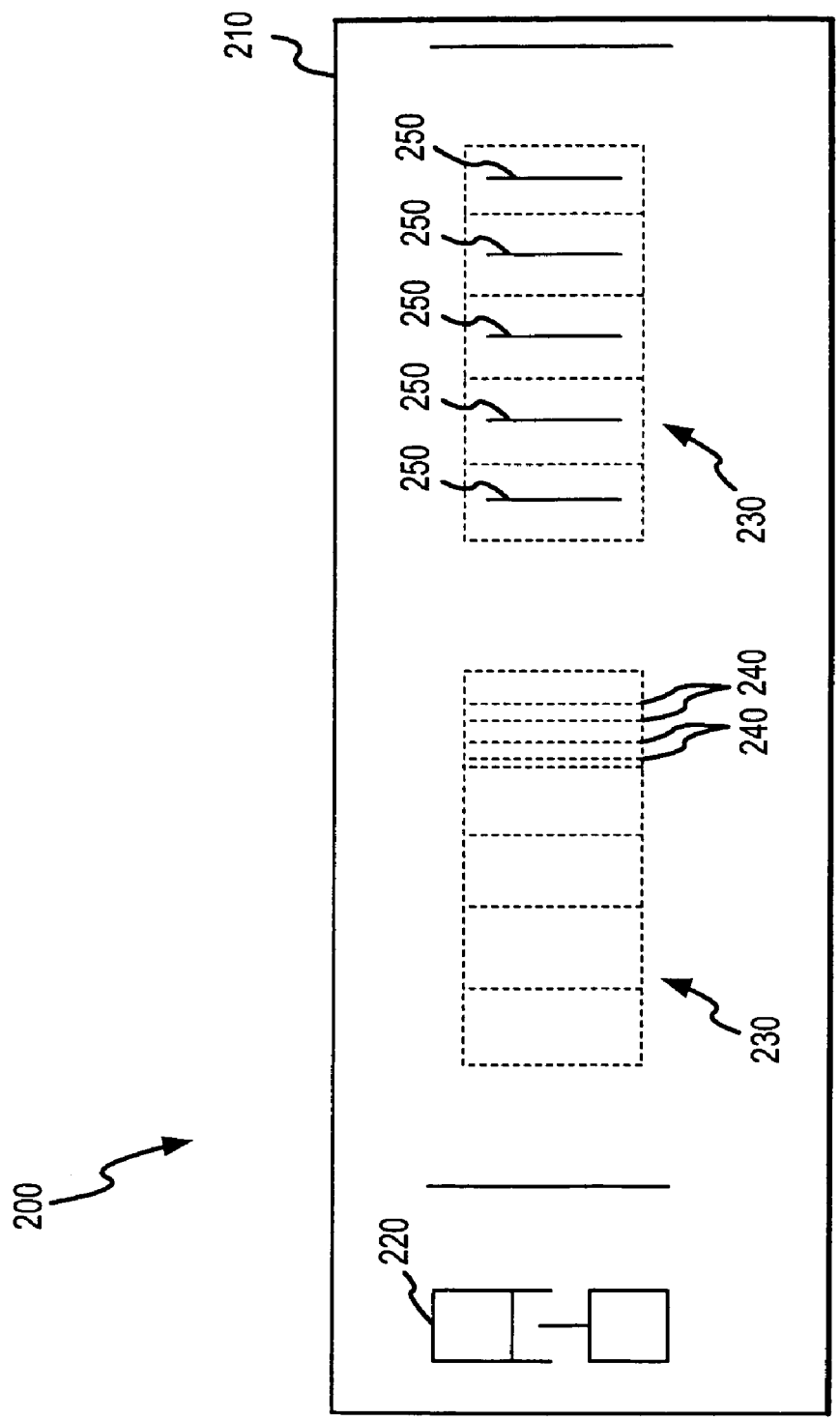
FIG. 2 illustrates an embodiment of a SAW identification tag that can be beneficially employed with the present invention.

Turning to FIG. 2, illustrated is an embodiment of a SAW identification tag 200 that can be beneficially employed with the present invention. On one end of a substrate 210 of the SAW tag 200 is a transducer 220 that, in response to an interrogation signal from a SAW identification tag reader, generates a signal having a known frequency and amplitude. This signal travels as a surface acoustic wave (SAW) down the substrate 210. On the substrate are one or more groups 230 of slots 240 that are located and arranged by both pulse position and phase position. Also located on the substrate 210 are a number of encoding reflectors 250 to reflect a portion of the SAW signal back to the transducer 220 as a return signal. These encoding reflectors are arranged by both pulse position and phase position in the slots 240 so that the reflected return signal will have encoded therein a globally unique signal. This return signal is then detected by a SAW identification tag reader and decoded to reveal the globally unique identification number assigned to that SAW identification tag 200. For a detailed description of these and other features of SAW identification tags 200, see the above referenced patent application.

To understand how the arrangement of reflectors 220 results in a return signal with sufficient data to encode a globally unique number, it is helpful to consider relevant signal modulation methods. In conventional pulse position modulation (PPM) a data stream can be coded by dividing it into separate sample values where a single pulse is used to transmit information contained in a sample. Changing the time position of that single pulse over a predetermined span of time serves to transmit the information in that sample. Single pulses in subsequent time spans are similarly used to transmit information in subsequent sample values.

Figure 3:
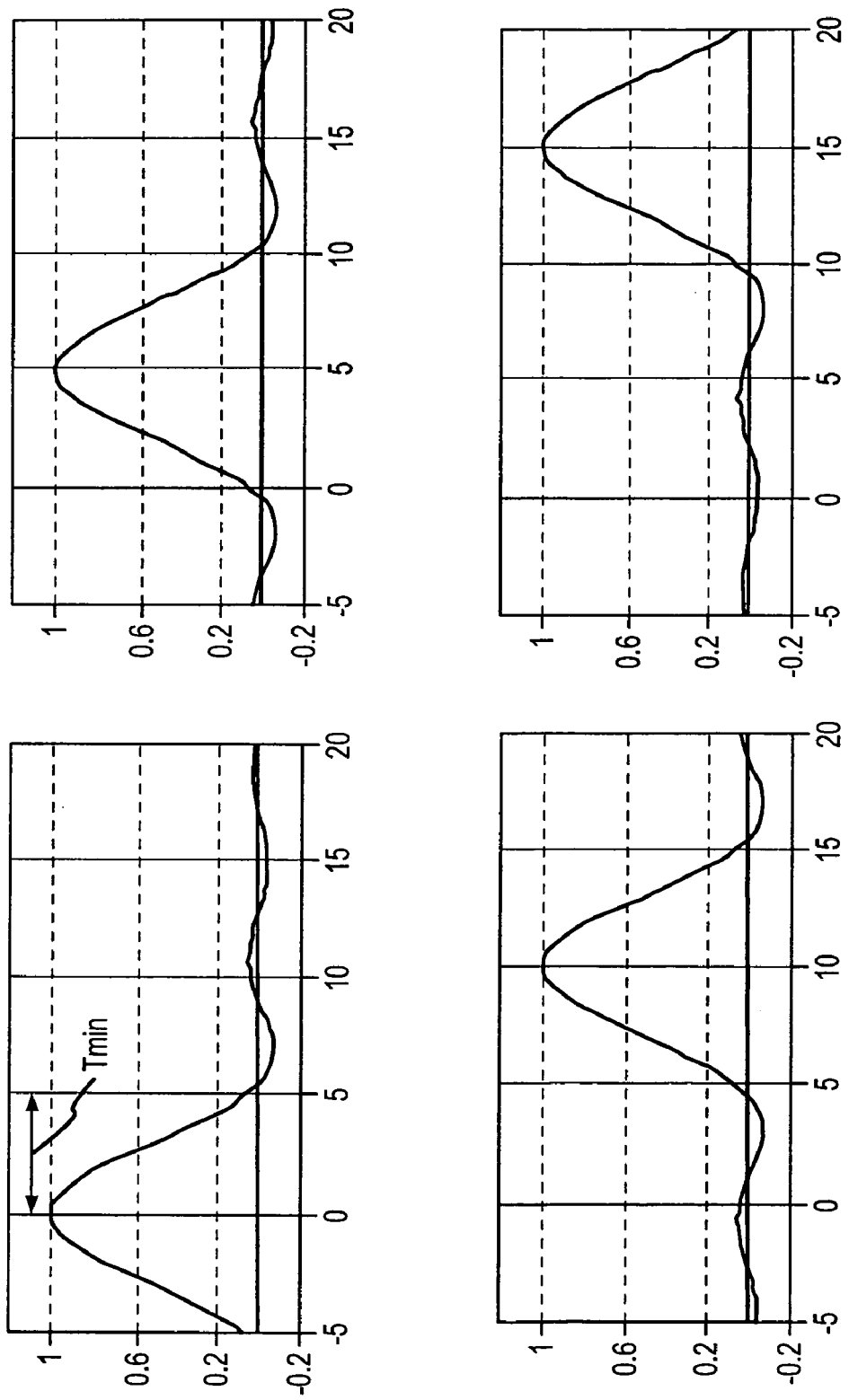
FIG. 3 illustrates an example of digital PPM showing four pulse positions of a time span where data can be transmitted using conventional PPM.

Turning now to FIG. 3, illustrated is an example of digital PPM showing four pulse positions of a time span where data can be transmitted using conventional PPM. In this case, the sample to be transmitted is digital and has one of four possible values. Shown are four possible waveforms which consist of nominally identical single pulse waveforms whose time positions can be centered in one of four time locations or pulse positions. The minimum time spacing required between pulse positions to ensure that skirts from neighboring pulse positions are essentially zero at the peak of any selected pulse is Tmin. Of course, pulse spacing wider than Tmin can be used without affecting the ability to demodulate a PPM signal, however, if pulses positions are spaced more closely than Tmin, it becomes more difficult to unambiguously distinguish one pulse position from its neighbor. Using a reader to sample the PPM waveform at each of the four possible peak pulse positions and selecting the largest one results in the demodulation of conventional PPM. It is readily apparent to those of ordinary skill in the relevant art that the demodulation process must be synchronized using one of a number of synchronization methods known in the art.

The four possible pulse positions represent two binary bits of data. A subsequent group of four pulse positions occupied by a single pulse can represent an additional two binary bits of data. As many sequential groups of four pulse positions as necessary can be used to represent a desired data word containing many bits of information.

PPM modulation is a favored modulation method for tags based on SAW devices, because (1) a single pulse can be readily created and programmed by a SAW reflector placed on the SAW substrate, (2) the various pulse time positions directly relate to the spatial place of possible SAW reflectors, (3) the number of data bits is greater than the number of signal pulses which reduces tag insertion loss and (4) the number of SAW reflectors remains constant for all possible tags identification numbers which leads to reasonably low loss tags with uniform pulse amplitudes for any tag identification. However, the use of PPM for SAW tags also has limitations including: (1) PPM data density is low, which increases the chip size (and hence cost); (2) the low data density combined with practical maximum sizes for SAW chips creates an upper limit on the number of bits for practical tags; and (3) multi-bounce reflections between the various reflectors in a PPM SAW tag create unwanted pulses that can interfere with later portions of the PPM pulse train.

In FIG. 3, Tmin represents a slot defining a time length centered on any of the possible pulse positions. A group is represented by a collection of adjacent slots. Shown is one group of four slots with four states that represent two binary data bits. If four groups of four slots are used there are 256 possible states (or combinations) as given by 4 states×4 states×4 states×4 states=256 states. This corresponds to 8 bits of data (or four times more data than a single group). These 256 states (8 bits of data) occupy a total of 16 slots. If these 16 slots are combined into a single group and conventional PPM method is used, one pulse would occupy one of the 16 slots. The available 16 states (4 bits of data) is significantly smaller than the 256 states that would result from using the same 16 slots in four separate groups with four slots each.

If conventional PPM concepts are set aside and multiple pulses are allowed in a single group, the number of states is significantly increased. For example, if four pulses are allowed in a group of 16 slots, 1,820 states exist, which is significantly more than the 256 states available by using the more conventional PPM of four groups of four slots (which would occupy the same 16 slots). Further, if eight pulses are used in the group of 16 slots, 12,870 states are available, which is an even larger improvement. If seven, eight, or nine pulses in a group of 16 slots are allowed, 35,750 states are possible which corresponds to more than 15 bits of data compared to the eight bits of data if conventional PPM was used in the same space.

Once multiple pulses are allowed in a single group, it is not proper to describe the modulation format as PPM. A more suitable name for this method is multiple pulse per group keying (MPGK) where keying is the equivalent of modulation. There are several important possible variants of MPGK. This method is defined by (1) partitioning a data stream to be transmitted into one or more separate sample values; (2) using more than one (i.e., multiple) pulses to transmit a given sample value; (3) transmitting the more than one pulses in a span of time that is divided into time slots which are nominally but not necessarily adjacent; (4) the collection of the time slots comprising the span of time constitute a group of slots; and (5) distributing the multiple pulses among the group of slots in a predetermined manner to represent the information contained in the separate sample value. Groups can vary in the number of slots and/or in the number of occupied slots. All slots do not have to be identical (unequal slot widths, pulse amplitudes, etc. are allowed) nor do slots have to necessarily be adjacent to one another. A single group can be defined such that it only has a fixed number of occupied slots or, alternatively, it might allow for a varying number of occupied slots. A single data message could include more than one type of group (for example a header might be one type of group, the actual data a second type of group, and an error detection/correction word might be of a third type). All of these variants have particular usefulness in SAW RFID tags.

Figure 4:
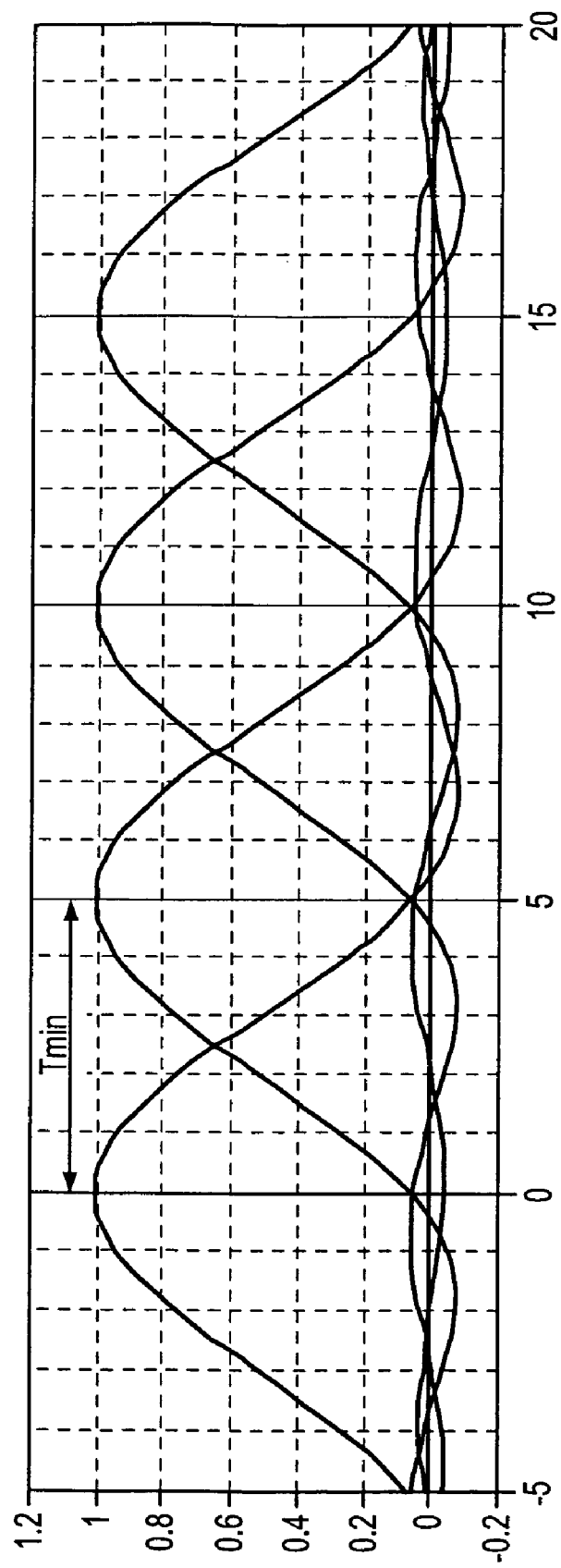
FIG. 4 illustrates an example an embodiment showing pulse positions for a conventional four state digital PPM.

Turning now to FIG. 4, illustrated is an example an embodiment showing pulse positions for a conventional four state digital PPM. In its simplest implementation, the modulation method uses a single pulse per group similar to conventional PPM. The example in FIG. 4 is a compact representation of the allowable pulse positions in a group with four slots with Tmin being the time separation between the allowable pulse peak positions. In PPM only one of these pulses is transmitted in this group and if the demodulation sampling is done at the allowable peak positions, three of the samples will be essentially zero and the correct sample will have an amplitude of unity. If sampling during demodulation is not properly synchronized to the peak positions, then the amplitude for the "correct pulse" location will start decreasing while the amplitude at a neighboring location will become larger than zero. However, the signal can still be correctly demodulated. If noise was also present in the system, then the probability of incorrect demodulation will be increased due to this timing error. However, if the timing error is small, the degradation is negligible. In principle, if the signal to noise ratio is sufficiently small, the signal can still be successfully demodulated as long as the timing error is less than Tmin/2.

The ability to successfully distinguish between two possible positions of a single pulse even when the pulses are partially overlapped can be used to increase the data density at the expense of signal to noise ratio sensitivity. This increase in data density is achieved by moving the allowable pulse positions closer together in a manner that the skirt of one allowable pulse position will overlap with the peaks of the neighboring pulse positions.

Figure 5:
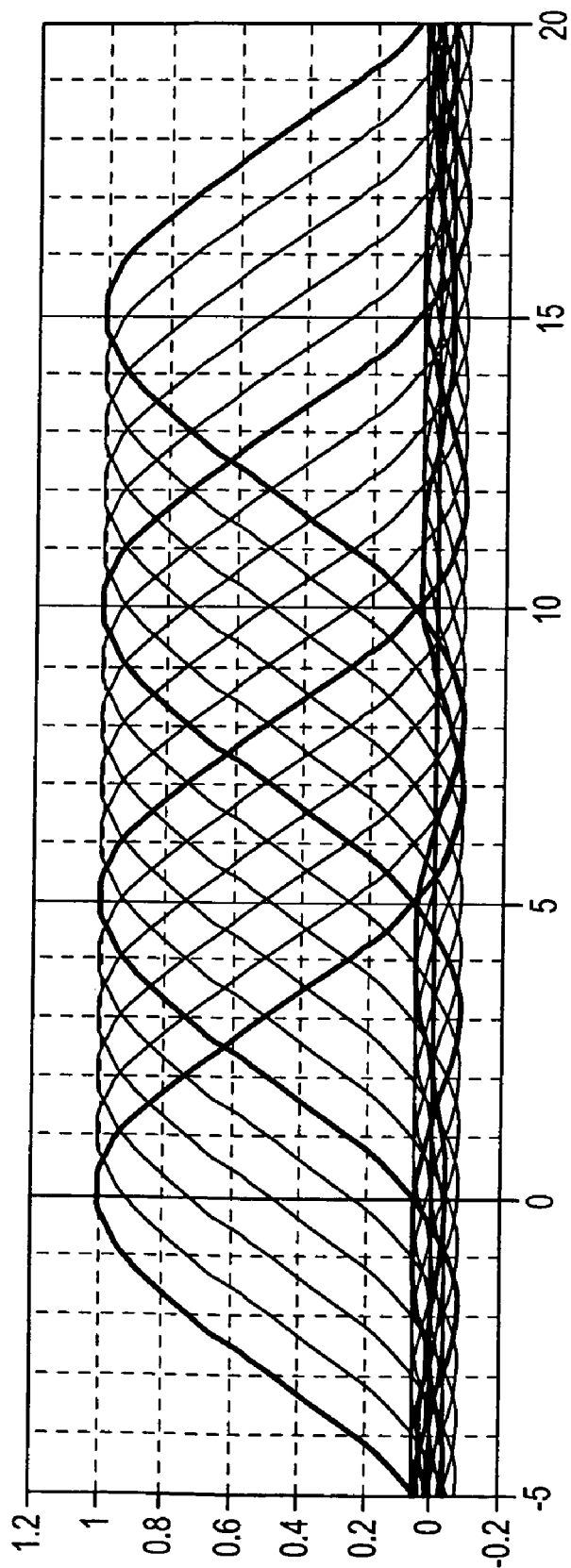
FIG. 5 illustrates an example of a allowable pulse positions with significant overlap.

Turning now to FIG. 5, illustrated in an example of a allowable pulse positions with significant overlap. The allowable pulse spacing has been reduced to one unit as compared to the five units shown in FIG. 4. In this case, the slot width is equal to Tmin/5 and thus potentially represents a five-fold increase in the number of states. This method for increasing data density is rarely used because of the obvious reduction in the detection margin for distinguishing neighboring pulse positions.

Figure 6:
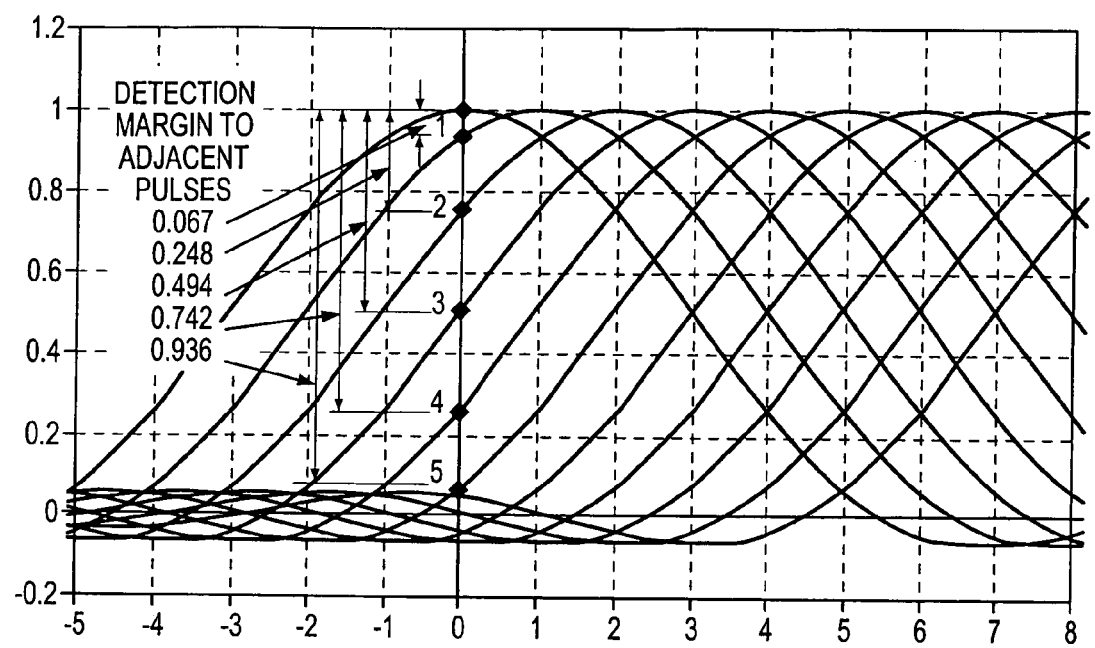
FIG. 6 illustrates the details of one embodiment of pulses with a five-fold increase in the number of states that has a limited detection margin.

Turning to FIG. 6, illustrated are the details of one embodiment of pulses with a five-fold increase in the number of states that has a limited detection margin. To demodulate a signal with the strongly overlapping pulses shown in FIG. 6, it would be necessary to sample the received signal at the peak locations of all possible pulse positions (i.e., at all integer locations on the horizontal axis in FIG. 6). As is evident from FIG. 6, discrimination is particularly poor with respect to the adjacent pulse positions, but this discrimination increases for next adjacent pulse, third adjacent pulse, etc. The present invention provides for a novel modulation format as described herein. The allowable pulses are modified such that each pulse not only has a different time position but also an added phase step between each adjacent pulse. For example, if a phase step of ±90° is added between each adjacent pulse, then the pulse at t=0 (time equals zero) will have 0°, the pulse at t=1 will have ±90°, the pulse at t=2 will have ±180°, the pulse at t=3 will have ±270°, the pulse at t=1 will have ±360°, etc.

Figure 7A:
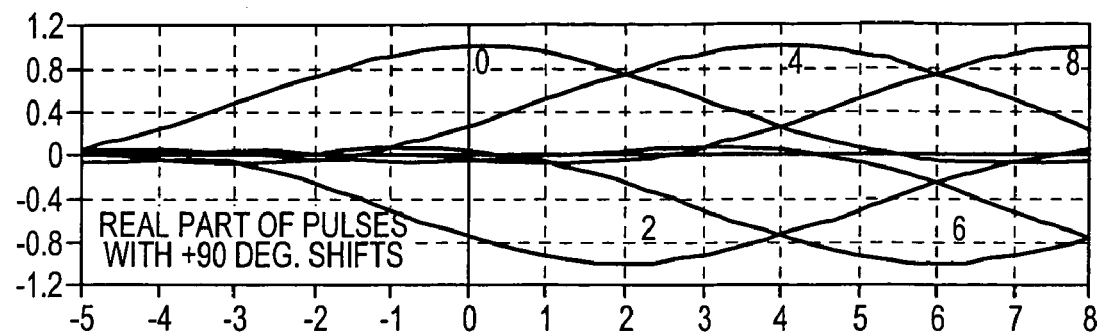
FIGS. 7A and 7B illustrate the real and imaginary parts of overlapping pulses with an added phase shift of +90°.
Figure 7B:
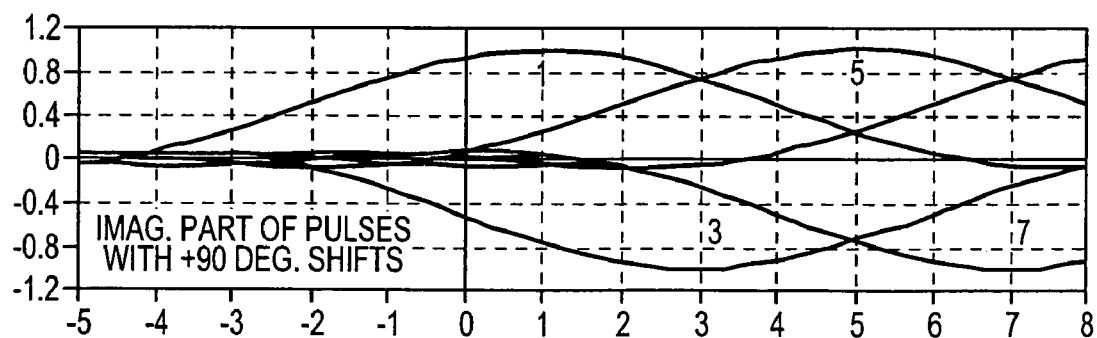

Turning now to FIGS. 7A and 7B, illustrated are the real and imaginary parts of overlapping pulses with an added phase shift of +90°. Because phase multiples of 90° are used in the illustrated embodiment, the odd numbered pulses (1, 3, 5, etc.) have real parts equal to zero and the even numbered pulses have imaginary parts equal to zero. A wide range of phase angles can be used, many of which can give equal or better performance than this particular 90° case. For example, a stepping angle could vary by more than ±20° without any significant degradation. To demodulate the signal in FIG. 7A, it would be necessary for the SAW identification tag reader to sample the real part of the received signal at the peak locations (t=0, 1, 2, etc.) as well as shifting the phase of the sampling signal from one time slot to the next such that it would agree with the expected phase of a pulse if it should occur at that slot locations.

Figure 8:
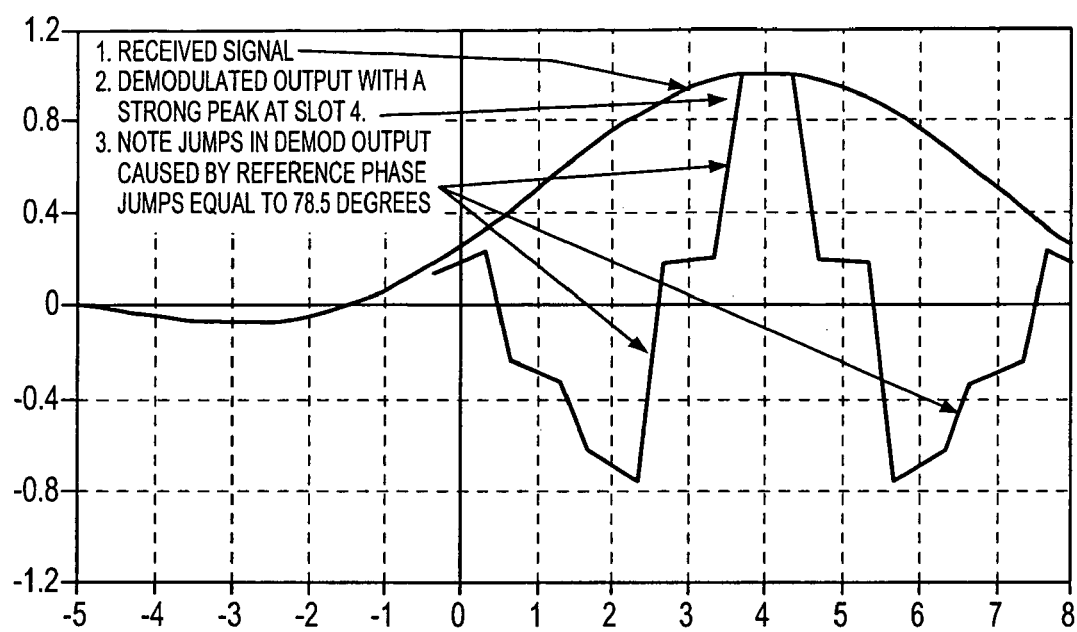
FIG. 8 illustrates an embodiment where a phase increment other than 90° is used with substantially improved discrimination between the correct state and the neighboring states where the allowable pulse spacings are Tmin/5 and a 78.5° phase difference between adjacent allowed states is used.

Turning now to FIG. 8, illustrated is an embodiment where a phase increment other than 90° is used with substantially improved discrimination between the correct state and the neighboring states where the allowable pulse spacings are Tmin/5 and a 78.5° phase difference between adjacent allowed states is used. In FIG. 8 a phase increment other than 90° was chosen to illustrate the substantially improved discrimination between the correct state and the neighboring states for a wide variety of phase angles. Even more important, FIG. 8 illustrates a dramatic improvement as compared to the identical allowed pulse spacing without phase shifts as was illustrated earlier in FIG. 6. The cases of FIG. 6 and FIGS. 7 and 8 have the identical approximate five-fold improvement in the number of states as compared to the more conventional PPM with allowable pulse spacing of Tmin. But, without the phase shifts (FIG. 6), the detection minimum margin is only 0.067 while, with the phase shifts (FIGS. 7&8), the detection margin to adjacent states is now 0.81 which is very similar to the more conventional PPM which has a detection margin approaching unity.

In another embodiment, pulse modulation can be characterized by simultaneously shifting both the phase and the time location of a pulse communication signal in a known manner. This embodiment will be henceforth designated as simultaneous phase and time shift keying (PTSK) where keying is the equivalent of modulation. While the discussion herein only considered uniformly spaced time shifts and uniformly spaced phase shifts, those of ordinary skill in the pertinent art will understand that non-uniform spacing of either the time or phase shifts (or both) can be done.

In this embodiment a stream of data (1) is partitioning into one or more separate sample values; (2) at least one pulse is used to transmit a given sample value; (3) the at least one pulse is transmitted in a span of time that is divided into time slots that are nominally, but not necessarily, adjacent; (4) the collection of time slots comprising the span of time constitutes a group of slots; (5) each slot has a unique phase shift and a unique time location; and (6) the at least one pulse is contained within the group of slots in a predetermined manner to represent the information contained in the separate sample value. Groups can vary in the number of slots and/or in the number of occupied slots and still be within the scope of the present invention. Also, a single group can be defined such that it only has a fixed number of occupied slots or, alternatively, it might allow for a varying number of occupied slots. Also, a single data message could include more than one type of group (for example the header might be one type of group, the actual data a second type of group, and an error detection/correction word might be of a third type). All of these variants have particular usefulness in SAW RFID tags and are all within the intended scope of the present invention.

A combined multi-pulse group keying and simultaneous phase and time shift keying (MPG/PTSK) can also be implemented. In MPGK multiple pulses were used in one group but Tmin separated the pulse positions. In PTSK only one pulse per group (like conventional PPM) was used, but the allowable pulse positions were allowed to be significantly smaller than Tmin. Combining the two types requires attention to certain subtle details. In the MPGK case, two adjacent slots can both be occupied because, as described above, the skirt of one pulse does not overlap the peak of any neighboring pulses (the same as for conventional PPM as shown in FIG. 3). However, if two adjacent or closely neighboring slots were allowed to be simultaneously occupied when using strongly overlapping pulses (as in FIG. 6), the potential for strong inter-symbol interference would exist between pulses and could result in almost total cancellation between the two where a significant phase shift between pulses is present (e.g., FIGS. 7 and 8). This potential interference must be addressed if the MPGK modulation method is to be successfully combined with the PTSK method.

A primary method for solving the interference problem is to impose a minimum pulse spacing rule when using MPGK along with PTSK. One generally useful rule is that while the allowable pulse positions can have time separations significantly smaller than Tmin, in a specific waveform any two actual pulses included in that waveform must always have a minimum spacing greater than Tmin.

Figure 9:
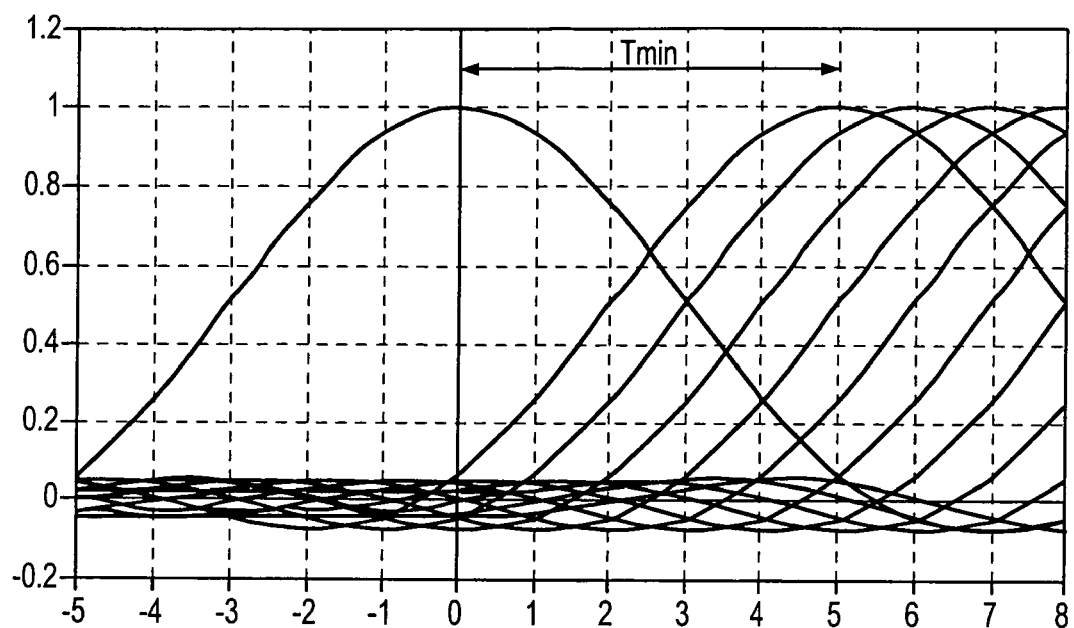
FIG. 9 illustrates an embodiment of a minimum pulse spacing rule that allows using MPGK along with PTSK.

Turning to FIG. 9, illustrated is an embodiment of a minimum pulse spacing rule that allows using MPGK together with PTSK. In this example, one pulse in the waveform is selected to occur at t=0 and, by the minimum pulse spacing rule, the next pulse is excluded from positions t=1, 2, 3, and 4, but is allowed to occur at positions t=5, 6, 7, etc. (Note: the PTSK phase shifts between pulse slots have been omitted for clarity.) Note that at least four pulse slots had to be skipped between selected pulses where Tmin is equal to five slots. In a more general case, if a slot width equals Tmin/N then a skip factor can be defined that will equal N−1. Larger skip factors can be used and could be beneficial in certain cases (for example in operating environments with strong outside interference). Somewhat smaller skip factors could also be beneficial in other cases but it appears that assuring a minimum spacing equal to Tmin will likely be the best choice in most circumstances.

Another method for solving the potential interference problem of two adjacent slots being occupied when PTSK is combined with MPGK is based on the orthogonality between adjacent slots that arises if the phase shift between slots is ±90° (see the example given earlier in FIG. 6). If the phase is sufficiently close to ±90°, then a pulse in any given slot will not interfere with either of the two adjacent slots. In this case, all odd numbered slots are totally independent of all even numbered slots. However, a pulse can still interfere with its $2^{nd}$, $4^{th}$, $6^{th}$, etc. nearest neighbors if the spacing of these neighbors is closer than Tmin. In this special "orthogonal nearest neighbor" case, a useful method for analyzing the options is to divide the slots into two intertwined sub-groups (I and Q). Then, if necessary, the Tmin minimum spacing rule illustrated in FIG. 9 is separately applied to each sub-group.

This embodiment of using PTSK combined with MPGK is generally characterized by a significant overlap between the pulses in neighboring slots. Variants of this embodiment can be derived from the earlier descriptions of PTSK and MPGK. However, the combination of PTSK and MPGK should consider the need for providing a means to avoid the potential inter-symbol interference effects that may arise when using pulses that have significant overlap with neighboring slots. Since this method combines the characteristics of two embodiments previously described it can appropriately be called MPG/PTSK (i.e., combined multi-pulse groups with simultaneous phase and time shift keying).

Turning now to FIG. 10, illustrated is a table showing the 286 possible states that exist when three reflectors are used in a group of 21 slots having a skip factor of four. This is an example of a single group where a SAW RFID tag has three reflectors per group, with 21 slots per group, a skip factor of four, and a phase increment between adjacent slots ranging from 750° to 105°. The phase increment between adjacent slots is the same as was described earlier in conjunction with FIGS. 7 and 8. The five-fold overlap between neighboring pulses required a skip factor of four. It is evident that 286 states are sufficient to encode the 256 states that correspond to 8 bits of data. This particular variant has a group size that is almost identical to the one described in FIG. 4 with the same number of data bits. However, it has two major advantages in that it only uses three SAW reflectors instead of four, and second, it is less susceptible to common transmission distortion effects such as short-path multi-path signal transmission and other pulse smearing effects.

Turning now to FIG. 11, illustrated is a table showing the states for a SAW RFID tag with 10 slots, two reflectors and 36 possible placements. This table was taken from a situation where the SAW RFID tag had four reflectors per group, 20 slots per group and a skip factor of three and a phase increment between adjacent slots of plus or minus 90°, where the group is divided into two sub-groups. This example is quite similar to the previous example in which four distinct phase states are divided into two sub-groups of ten slots each. Each sub-group can be treated as having a skip factor of one. The table gives the states corresponding to one such sub-group. The only difference between this example and the previously example is that the two in-phase reflectors (+I & −I) can be of either the same sign or of opposite signs. The major advantage of this example is that with 36 states per sub-group, a total of 10 bits per group can be obtained, which is better than the eight bits in the previous example. The disadvantages of this example are possibly worse spurious reflections than the previous example and the general sensitivity to pulse smearing effects.

Turning now to FIG. 12, illustrated is a table showing one sub-group of states from a SAW RFID tag with four reflectors per group, 20 slots per group, a skip factor of three, a phase increment between adjacent slots ±90° with division into two sub-groups and only one reflector of each specific phase per group. This table is from the previous example in which four distinct phase states are used that divide into two sub-groups of 10 slots each where each sub-group has a skip factor of one. Only one reflector of each specific phase is used in each group.

Figure 13:
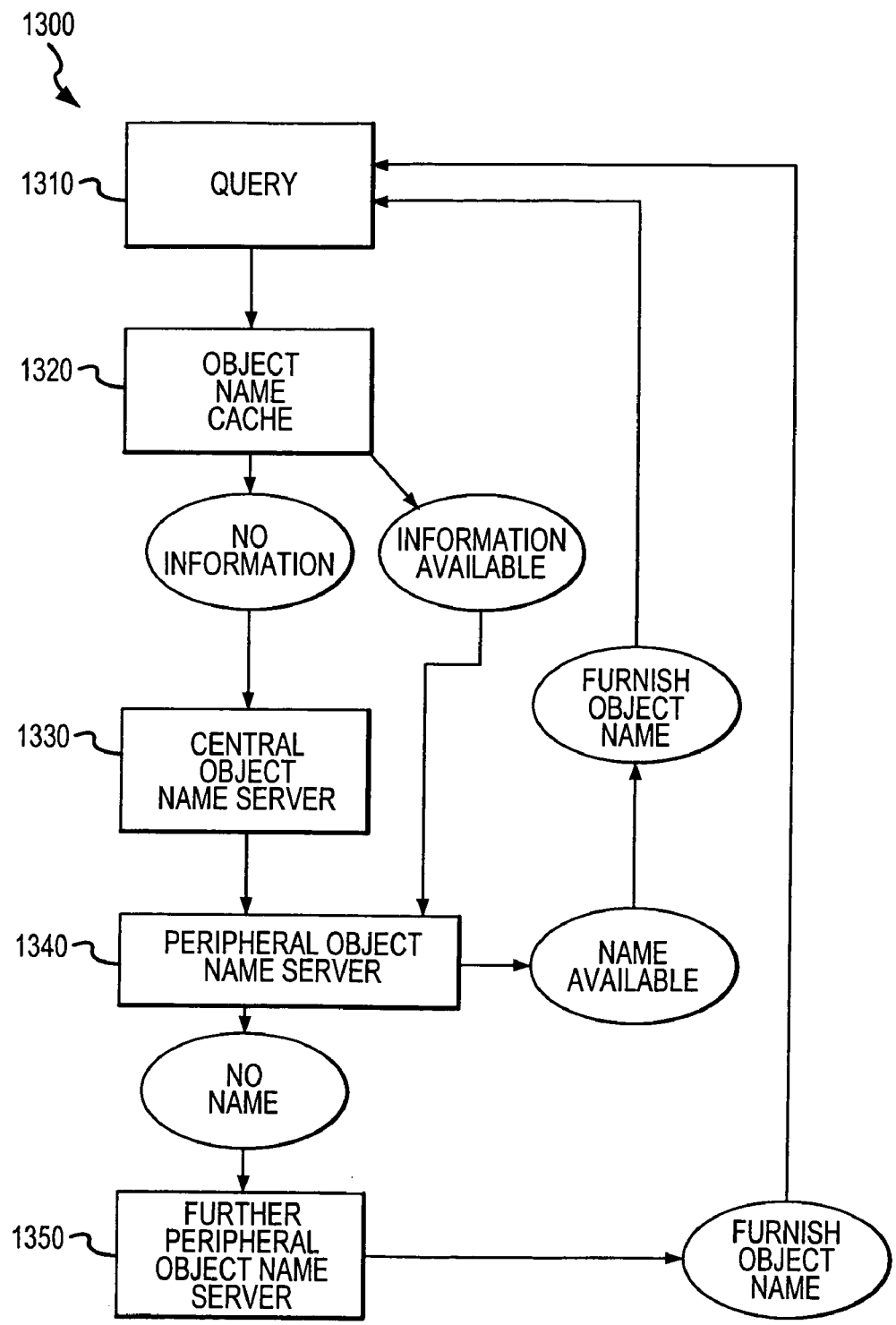
FIG. 13 illustrates a flow chart describing one embodiment of a method of responding to a query for an object name in accordance with the present invention.

Turning now to FIG. 13, illustrated is a flow chart describing one embodiment of a method of responding 1300 to a query for an object name in accordance with the present invention. In one embodiment of the method, an object name query comprises a unique code associated with the object name. In still another embodiment, the method of responding 1300 is based on deriving a 96-bit number from an identification tag to form the object name query. In yet another embodiment, the method of responding 1300 is based on deriving information from a SAW identification tag to form the object name query.

If the embodiment of the invention represented in FIG. 13 is based on a unique code derived from 96-bit number encoded on a SAW identification tag 200, it may be a SAW tag 200 similar to that illustrated in FIG. 2 with twelve groups 230 of 21 slots 240 located on the substrate 210. If the SAW tag 200 has three reflectors 250 located in each group 230 (using a skip factor of four and a phase increment between adjacent slots ranging from 75° to 105°), there are a possible 286 states that will exist for each group. As described and illustrated with respect to FIG. 10, these 286 states are clearly sufficient to encode the required 256 states necessary to correspond to 8 bits of data. Thus, with twelve groups 230 of slots 240, each group 230 encoding 8 bits of data, a 96-bit number can easily be accommodated on a SAW identification tag 200. This 96-bit number, as those skilled in the pertinent art will recognize, provides for a prodigious address space.

A 96-bit address space on a SAW identification tag 200 can be divided into a number of fields representing a variety of addressing schemes, all of which are within the intended scope of the present invention. For example, a portion of the address space can be designated as a "manufacturer field" where information and data about the tag itself can be encoded, such as the date of manufacture and anti-counterfeiting codes. Other fields in the address space can be used for other functions, such as a "customer field" to provide information on the business or businesses using the tag or series of tags to identify objects. In one embodiment of the invention, for example, the method provides for using address space for centrally assigning peripheral object name servers of the second hierarchical level. In still another embodiment, address space is used for further peripheral object name servers of a third hierarchical level. There is, in short, abundant space for a central authority to assign address space to a number of functions. Such a central authority can assign such space pursuant to a protocol to be developed or any other structured system that keeps the overall assignment of address space orderly and intact.

The method of responding 1300 illustrated in FIG. 13, provides for an object querying system initially directing an object name query 1310 to an object name cache 1320 maintained by the object querying system. The object name cache 1320 is queried first to see if information about the identification tag and its object is in the cache 1320 before initially directing the query 1310. If the cache 1320 contains no information, the query is directed to a central object name server 1320 (constituting a first hierarchical level) that then directs the query 1310 to one of the peripheral object name servers 1340 (constituting a second hierarchical level). If the object name cache 1320 has information available, the query 1310 is instead directed to one of the peripheral object name servers 1340 and the first hierarchical level is skipped. If the peripheral object name server 1340 has the object name, it responds to the query 1310 with such name. If the peripheral object server 1340 does not have the name, the query 1310 is instead directed to a further peripheral object name server 1350 (constituting a third hierarchical level) to provides the object name.

In applying the example illustrated in FIG. 13, consider an identification tag manufacturer, such as the manufacturer of SAW identification tags, that maintains a central object name server with data relevant to all the customers for which it has manufactured identification tags. This information is on a central object name server that constitutes the first hierarchical level and is made available by way of a computer network or networks (which computer network could by the Internet). If the identification tags were designated for use by a specific industry or customer, such as the automotive or aircraft manufacturing industry, a field encoded on the tag would so indicate. The industry or customer would maintain a peripheral object name server containing identification information regarding objects to which the tag has been attached or associated. This peripheral object name server is also coupled to a computer network (which may be the Internet) and constitutes a second hierarchical level. In some cases the industry or customer may provide for additional object naming levels. For example, a large automobile manufacturer may have a number of different facilities, such as a number if part manufacturing facilities and assembly plants, that assign identification numbers to objects. Such facility or plant may also maintain a further peripheral object name server that will constitute a third hierarchical level.

Using the automobile business as an example, assume an identification tag reader is used by a repair shop to identify the globally unique number that is encoded on an automobile part and the repair shop wants additional object identification information, such as the year of manufacture. Using the method for responding 1300 illustrated in FIG. 13, a query 1310 is instituted by the repair shop using an object querying system. The object querying system maintains an object name cache 1320 that is queried first to see if information about the identification tag is in the cache before the object querying system initially directs the query 1310. If the cache contains no information about the query 1310, the object querying system then directs the query 1310 to a central object name server 1330 (such as the identification tag manufacturer), which is the first hierarchical level of the object-naming infrastructure. The central object name server 1330 then uses information provided by the tag's "customer field" to direct the query 1310 to a peripheral object name server 1340 maintained by an automobile manufacturer. This constitutes the second hierarchical level which either provides a response to the query 1310 with an object name or directs the query 1310 to instead query 1310 a further peripheral object name server 1350 constituting a third hierarchical level that provides the object name.

If an object name is maintained in the object name cache that is first queried, and the first response is first directed to a peripheral object naming server or even a further object naming server instead of to the central object name server, this represents a significant improvement in efficiency over prior art systems. This would be the case, for example, if "customer field" are automatically cache in querying systems when tags are first designated for use by a particular industry or customer. The cache may also by used to store information from previous queries. If the the cache has sufficient data, a query can be directed to the appropriate hierarchical level and skip any intervening levels. This should be contrasted with present-day DNS that must deal with arbitrary address space assignments and requires each inquiry to go to a first hierarchical level. The object-naming infrastructure described herein results in a dramatically decreased amount of traffic that the central object name server is required to handle. Unlike DNS, even partial addresses can assist the querying systems in avoiding queries to the central object name server or lower hierarchies. By keeping the overall assignment of address space orderly and intact, it allows cached former queries to guide the direction of future queries so as to avoid higher server hierarchies as much as possible.

Although the present invention has been described in detail, those skilled in the art should understand that they can make various changes, substitutions and alterations herein without departing from the spirit and scope of the invention in its broadest form.

What is claimed is:

1. An object-naming network infrastructure, comprising:
a central object name server coupled to a computer network and constituting a first hierarchical level; and
peripheral object name servers coupled to said computer network and constituting a second hierarchical level, said central object name server responding to an object name query, derived from a surface acoustic wave identification tag having data encoded thereon by both pulse position and phase position received from a querying system by directing said querying system to query instead one of said peripheral object name servers in said second hierarchical level, said one of said peripheral object name servers alternatively responding to said query with an object name or directing said querying system to query instead further peripheral object name servers constituting a third hierarchical level, wherein said querying system is associated with a tag reader.

2. The infrastructure as recited in claim 1 wherein said object name query comprises a unique code associated with said object name.

3. The infrastructure as recited in claim 1 wherein said object name query comprises a 96-bit number derived from an identification tag.

4. The infrastructure as recited in claim 1 wherein said querying system contains an object name cache for containing said object name, said querying system directing said object name query to said cache before directing said object name query to said central object name server.

5. The infrastructure as recited in claim 1 wherein at least some of said peripheral object name sewers of said second hierarchical level are associated with corresponding object manufacturers.

6. The infrastructure as recited in claim 1 wherein address spaces of said peripheral object name servers of said second hierarchical level are centrally assigned.

7. The infrastructure as recited in claim 1 wherein address spaces of said further peripheral object name servers of said third hierarchical level are assigned by corresponding object manufactures.

8. The infrastructure as recited in claim 1 wherein said computer network is the Internet.

9. A method of responding to a query for an object name, comprising:
initially directing a query derived from a surface acoustic wave identification tag having data encoded thereon by both pulse position and phase position, to a central object name server coupled to a computer network and constituting a first hierarchical level;
subsequently directing said query instead to one of peripheral object name servers coupled to said computer network and constituting a second hierarchical level; and
alternatively responding to said query with an object name or directing said query instead to further peripheral object name servers constituting a third hierarchical level, wherein said querying system is associated with a tag reader.

10. The method as recited in claim 9 wherein said object name query comprises a unique code associated wit said object name.

11. The method as recited in claim 9 further comprising deriving a 96-bit number from an identification tag to form said object name query.

12. The method as recited in claim 9 wherein said querying system contains an object name cache for containing said object name, said method further comprising first directing said object name query to said cache before said initially directing.

13. The method as recited in claim 9 wherein at least some of said peripheral object name servers of said second hierarchical level are associated with corresponding object manufacturers.

14. The method as recited in claim 9 further comprising centrally assigning address spaces of said peripheral object name servers of said second hierarchical level.

15. The method as recited in claim 9 further comprising assigning, by corresponding object manufacturers, address spaces of said further peripheral object name servers of said third hierarchical level.

16. The method as recited in claim 9 wherein said computer network is the Internet.

17. An object-naming network infrastructure, comprising:
a central object name server coupled to the Internet and constituting a first hierarchical level; and
peripheral object name servers coupled to the Internet, associated wit corresponding object manufacturers and constituting a second hierarchical level, said central object name server responding to an object name query derived from a surface acoustic wave identification tag having data encoded thereon by both pulse position and phase position, received from a querying system by directing said querying system to query instead one of said peripheral object name servers in said second hierarchical level, said one of said peripheral object name servers alternatively responding to said query with an object name or directing said querying system to query instead further peripheral object name servers constituting a third hierarchical level, wherein said querying system is associated with a tag reader.

18. The infrastructure as recited in claim 17 wherein said object name query comprises a unique code associated with said object name.

19. The infrastructure as recited in claim 17 wherein said object name query comprises a 96-bit number derived from an identification tag.

20. The infrastructure as recited in claim 17 wherein said querying system contains an object name cache for containing said object name, said querying system directing said object name query to said cache before directing said object name query to said central object name server.

21. The infrastructure as recited in claim 17 wherein address spaces of said peripheral object name servers of said second hierarchical level are centrally assigned.

22. The infrastructure as recited in claim 17 wherein address spaces of said further peripheral object name servers of said third hierarchical level are assigned by said corresponding object manufacturers.

* * * * *